United States Patent
Kitao et al.

(10) Patent No.: US 7,452,631 B2
(45) Date of Patent: Nov. 18, 2008

(54) NON-AQUEOUS ELECTROLYTE SECONDARY BATTERY

(75) Inventors: Hideki Kitao, Kobe (JP); Toyoki Fujihara, Tokushima (JP); Kazuhisa Takeda, Tokushima (JP); Naoya Nakanishi, Tokushima (JP); Toshiyuki Nohma, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 490 days.

(21) Appl. No.: 11/138,268

(22) Filed: May 27, 2005

(65) Prior Publication Data

US 2005/0266313 A1  Dec. 1, 2005

(30) Foreign Application Priority Data

May 28, 2004  (JP) ............................. 2004-158780

(51) Int. Cl.
*H01M 4/58* (2006.01)

(52) U.S. Cl. .............. 429/231.1; 429/231.2; 429/231.3; 429/231.5; 429/231.6; 429/224; 429/223; 429/218.1

(58) Field of Classification Search .............. 429/231.1, 429/231.2, 231.3, 231.5, 231.6, 224, 223, 429/218.1

See application file for complete search history.

(56) References Cited

FOREIGN PATENT DOCUMENTS

| | | | |
|---|---|---|---|
| CN | 1484336 A | | 3/2004 |
| JP | 2855877 | | 11/1992 |
| JP | 10-241691 | * | 9/1998 |
| JP | 11-040153 | * | 2/1999 |
| JP | 11-040154 | * | 2/1999 |
| JP | 2003-217587 | * | 7/2003 |
| JP | 2005-116321 | * | 4/2005 |

* cited by examiner

*Primary Examiner*—Laura S Weiner
(74) *Attorney, Agent, or Firm*—Kubovcik & Kubovcik

(57) ABSTRACT

In a non-aqueous electrolyte secondary battery using a layered lithium-transition metal composite oxide as a positive electrode active material, elevated-temperature durability, that is, elevated-temperature storage performance is enhanced without degrading battery capacity. The non-aqueous electrolyte secondary battery includes: a positive electrode including, as a positive electrode active material, layered lithium-transition metal composite oxide containing lithium, nickel, and manganese; a negative electrode active material capable of intercalating and deintercalating lithium; and a non-aqueous electrolyte having lithium ion conductivity, and the lithium-transition metal composite oxide contains a group IVA element and a group IIA element of the periodic table.

12 Claims, 1 Drawing Sheet

NON-AQUEOUS ELECTROLYTE SECONDARY BATTERY

BACKGROUND OF THE INVENTION

1. Field of the Invention

The present invention relates to non-aqueous electrolyte secondary batteries, such as lithium secondary batteries.

2. Description of Related Art

A high energy density battery can be built with a non-aqueous electrolyte secondary battery that uses as a positive electrode active material a layered lithium-transition metal composite oxide, such as a lithium cobalt oxide and a lithium nickel oxide, because such a battery attains a large capacity and a high voltage, about 4 V. A problem, however, with using such positive electrode active materials is that battery capacity degrades if the battery is set aside in a charged state under a high temperature environment.

To solve this problem, such a technique has been proposed that the transition metal site in the lithium-transition metal composite oxide is substituted by a different kind of element. For example, Japanese Patent No. 2855877 proposes a technique for suppressing oxidation decomposition of electrolyte solution on the surface of $LiCoO_2$ and stabilizing crystal structure by adding zirconium to $LiCoO_2$.

However, the addition of zirconium only as described above does not yield sufficient improvements in elevated-temperature storage performance.

BRIEF SUMMARY OF THE INVENTION

Accordingly, it is an object of the present invention to provide a non-aqueous electrolyte secondary battery having improved elevated-temperature durability, that is, improved elevated-temperature storage performance without degrading battery capacity, in the field of non-aqueous electrolyte secondary batteries that use a layered lithium-transition metal composite oxide as the positive electrode active material.

In order to accomplish the foregoing and other objects, the present invention provides a non-aqueous electrolyte secondary battery, comprising: a positive electrode utilizing, as a positive electrode active material, a layered lithium-transition metal composite oxide containing lithium, nickel, and manganese; a negative electrode having a negative electrode active material capable of intercalating and deintercalating lithium; and a non-aqueous electrolyte having lithium ion conductivity, wherein the lithium-transition metal composite oxide contains a group IVA element and a group IIA element of the periodic table.

DETAILED DESCRIPTION OF THE INVENTION

Figure 1:
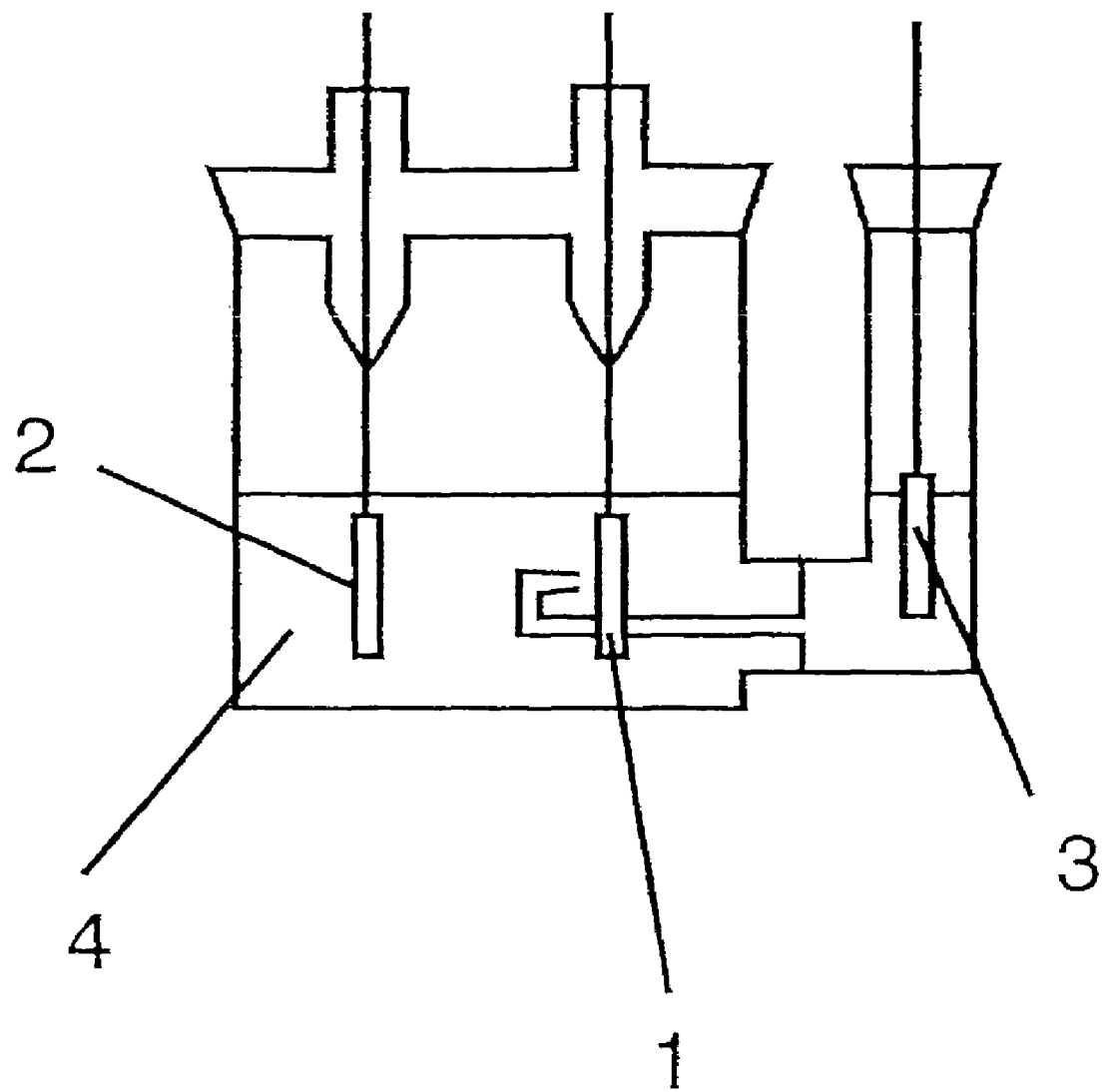
FIG. 1 is a schematic view illustrating a three-electrode beaker cell produced in one example of the present invention.

The non-aqueous electrolyte secondary battery according to the present invention utilizes, as its positive electrode active material, a lithium-transition metal composite oxide containing lithium, nickel, and manganese, and the lithium-transition metal composite oxide further contains a group IVA element and a group IIA element of the periodic table. Utilizing the lithium-transition metal composite oxide containing these elements makes it possible to enhance elevated-temperature durability (elevated-temperature storage performance).

Preferable examples of the group IVA element of the periodic table are Ti, Zr, and Hf, more preferable is Ti or Zr or a combination thereof, and especially preferable is Zr.

Preferable examples of the group IIA element of the periodic table include Mg, Ca, and Sr, and particularly preferable is Mg.

The total amount of the group IVA element and the group IIA element of the periodic table added is within the range of from 0.1 to 3.0 mole % with respect to the total of these elements and the transition metal element, and more preferably, within the range of from 0.3 to 1.0 mole %. If the total amount of the group IVA element and the group IIA element is less than 0.1 mole %, the effect of improvement in elevated-temperature durability may not be sufficient. On the other hand, if it exceeds 3.0 mole %, the rate characteristics of the battery or the like may degrade although the elevated-temperature durability improves.

In the present invention, it is preferable that the proportion of the group IVA element and the group IIA element of the periodic table be within the range of from 1/5 to 5/1 in mole ratio (group IVA element/group IIA element), and more preferably within the range of from 1/3 to 3/1. It is particularly preferable that the group IVA element and the group IIA element be contained in substantially equimolar amounts, that is, at a mole ratio within the range of from 1/1.2 to 1.2/1. By restricting the proportion of the group IVA element and the group IIA element to be within these ranges, the effect of improving elevated-temperature durability can be improved further.

The layered lithium-transition metal composite oxide used in the present invention contains nickel and manganese as transition metals. In order to increase its structural stability, it is preferable that the lithium-transition metal composite oxide further contain cobalt. The lithium-transition metal composite oxide as described above may be the one represented by the general formula $Li[Li_aMn_xNi_yCo_zM_b]O_2$, where M is at least one element selected from the group consisting of B, F, Al, Cr, V, Fe, Cu, Zn, Nb, and Sn; and a, b, x, y, and z satisfy the equations: $1.02 \leq (1.0+a)/(a+b+x+y+z) \leq 1.30$; $a+b+x+y+z=1$; $0 \leq b \leq 0.1$; $0.01 \leq x \leq 0.5$; $0.01 \leq y \leq 0.5$; and $z \geq 0$. To this lithium-transition metal composite oxide, a group IVA element and a group IIA element of the periodic table are added according to the present invention. In the foregoing general formula, b is more preferably in the range $0 \leq b \leq 0.03$.

In the present invention, the above-described layered lithium-transition metal composite oxide may be mixed with a lithium-manganese composite oxide having a spinel structure when used as the positive electrode active material. The lithium-manganese composite oxide having a spinel structure may further contain at least one element selected from the group consisting of B, F, Mg, Al, Ti, Cr, V, Fe, Co, Ni, Cu, Zn, Nb, and Zr. When such additional element(s) is/are contained, it is preferable that the amount of the element(s) is/are 3.0 mole % or less with respect to the total amount of the element(s) and manganese.

When the layered lithium-transition metal composite oxide and a lithium-manganese composite oxide having a spinel structure are mixed for use as a positive electrode active material, it is preferable that the weight ratio of the mixture (lithium-transition metal composite oxide:lithium-manganese composite oxide) be within the range of 1:9 to 9:1, and more preferably within the range of 6:4 to 9:1. By mixing the lithium-manganese composite oxide with the lithium-transition metal composite oxide within these ranges, the elevated-temperature durability can be improved further.

In the present invention, the negative electrode active material used for the negative electrode is not particularly limited as long as it is usable for non-aqueous electrolyte secondary batteries, but carbon materials are preferably used. Among the carbon materials, graphite materials are particularly preferable.

For the non-aqueous electrolyte, any electrolyte that is used for non-aqueous electrolyte secondary batteries may be used without limitation. The solvent of the electrolyte is not particularly limited, and usable examples include: cyclic carbonates, such as ethylene carbonate, propylene carbonate, butylene carbonate, and vinylene carbonate; and chain carbonates, such as dimethyl carbonate, methyl ethyl carbonate, and diethyl carbonate. Particularly preferable is a mixed solvent of a cyclic carbonate and a chain carbonate. An additional example is a mixed solvent of one of the above-described cyclic carbonates and an ether-based solvent such as 1,2-dimethoxyethane or 1,2-diethoxyethane.

The solute of the electrolyte is not particularly limited; examples thereof include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$ $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, and mixtures thereof. In addition to these solutes, it is preferable that a lithium salt having an oxalato complex as an anion be contained as a solute of the non-aqueous electrolyte, and more preferably, that lithium bis(oxalato) borate be contained.

Utilizing, according to the present invention, a layered lithium-transition metal composite oxide containing lithium, nickel, and manganese and further containing a group IVA element and a group IIA element of the periodic table as the positive electrode active material of the battery makes it possible to enhance the elevated-temperature durability (elevated-temperature storage performance) without degrading battery capacity. Although the mechanism of its working is not yet clear, it is believed that including a group IVA element and a group IIA element in the lithium-transition metal composite oxide serves to stabilize the crystal structure of the lithium-transition metal composite oxide, thereby minimizing deterioration of the active material surface that is caused by direct contact between the active material and the non-aqueous electrolyte and consequently improving the elevated-temperature storage performance.

DESCRIPTION OF THE PREFERRED EMBODIMENTS

Hereinbelow, the present invention is described in further detail. It should be understood, however, that the present invention is not limited to the following preferred embodiments but various changes and modifications are possible within the scope of the invention as defined in the appended claims.

EXAMPLE 1

Preparation of Lithium-transition Metal Composite Oxide $Li_2CO_3$, $(Ni_{0.4}Co_{0.3}Mn_{0.3})_3O_4$, $ZrO_2$, and $MgO$ were mixed at a mole ratio of Li : $(Ni_{0.4}Co_{0.3}Mn_{0.3})$:Zr:Mg=1.00: 0.99:0.005: 0.005, and the mixture was baked at 900° C. for 20 hours in an air atmosphere, so that $LiNi_{0.396}Co_{0.297}Mn_{0.297}Zr_{0.005}Mg_{0.005}O_2$ was obtained.

Preparation of Positive Electrode

The lithium-transition metal composite oxide prepared in the above-described manner, a carbon material as a conductive agent, and a N-methyl-2-pyrrolidone solution in which polyvinylidene fluoride was dissolved, as a binder agent, were mixed so that the weight ratio of the active material, the conductive agent, and the binder agent became 90:5:5 to prepare a positive electrode slurry. The prepared slurry was applied onto an aluminum foil as a current collector, and then dried. Thereafter, the resultant current collector was pressure-rolled using pressure rollers, and a current collector tab was attached thereto. A positive electrode was thus prepared.

Preparation of Negative Electrode

Graphite as a negative electrode active material, SBR as a binder agent, and an aqueous solution in which carboxymethylcellulose was dissolved as a thickening agent were kneaded so that the weight ratio of the active material, the binder agent, and the thickening agent became 98:1:1, and thus, a negative electrode slurry was prepared. The prepared slurry was applied onto a copper foil as a current collector, and then dried. Thereafter, the resultant current collector was pressure-rolled using pressure rollers, and a current collector tab was attached thereto. A negative electrode was thus prepared.

Preparation of Electrolyte Solution

LiPF6 as a solute was dissolved at 1 mole/liter in a solvent in which ethylene carbonate (EC) and diethyl carbonate (DEC) were mixed at a volume ratio of 3:7. An electrolyte solution was thus prepared.

Preparation of Three-electrode Beaker Cell

A three-electrode beaker cell A1 as illustrated in FIG. 1 was fabricated using the positive electrode prepared in the above-described manner for its working electrode, and metallic lithium for its counter and reference electrodes. As illustrated in FIG. 1, an electrolyte solution 4 was filled in a container of the beaker cell, and the working electrode 1, the counter electrode 2, and the reference electrode 3 were immersed in the electrolyte solution 4. The electrolyte solution prepared in the above-described manner was used as the electrolyte solution 4.

Assembling of Non-aqueous Electrolyte Secondary Battery

In the foregoing preparation of the positive electrode, the above-described lithium-transition metal composite oxide and a lithium-manganese composite oxide ($Li_{1.1}Al_{0.1}Mn_{1.8}O_4$) having a spinel structure were mixed as the positive electrode active material so that the weight ratio (lithium-transition metal composite oxide : lithium-manganese composite oxide) became 7:3. Except that the resultant mixture was used as the positive electrode active material, a positive electrode was prepared in the same manner in the foregoing.

The positive electrode thus prepared and a negative electrode prepared in the same manner as described above were coiled around with a polyethylene separator interposed therebetween, to prepare a wound assembly. In a glove box under an argon atmosphere, the resultant wound assembly was enclosed into a battery can together with the electrolyte solution. Thus, a cylindrical type of 18650 size (diameter of 18 mm and height of 65 mm) non-aqueous electrolyte secondary battery A2 having a rated capacity of 1.4 Ah was fabricated.

COMPARATIVE EXAMPLE 1

A lithium-transition metal composite oxide was prepared in the same manner as in Example 1, except that neither $ZrO_2$ nor MgO was added and that lithium and the transition metals were mixed so that the mole ratio of lithium and the total of the transition metals became an equimolar amount in the preparation of the lithium-transition metal composite oxide of Example 1. Using the resultant mixture, a three-electrode beaker cell B1 and a non-aqueous electrolyte secondary battery B2 were fabricated in the same manner as described above.

COMPARATIVE EXAMPLE 2

A lithium-transition metal composite oxide was prepared in the same manner as in Example 1 except that $ZrO_2$ was not added and that MgO alone was added to the lithium-transition metal composite at 5 mole % with respect to the total of the MgO and the transition metals in the preparation of the lithium-transition metal composite oxide of Example 1. Using the lithium-transition metal composite oxide thus prepared, a three-electrode beaker cell C1 was fabricated.

COMPARATIVE EXAMPLE 3

A lithium-transition metal composite oxide was prepared in the same manner as in Example 1 except that MgO was not added and that $ZrO_2$ alone was added to the lithium-transition metal composite at 5 mole % with respect to the total of the MgO and the transition metals in the preparation of the lithium-transition metal composite oxide of Example 1. Using the lithium-transition metal composite oxide thus prepared, a three-electrode beaker cell D1 and a non-aqueous electrolyte battery D2 were fabricated.

Measurement of Discharge Capacity of Three-electrode Beaker Cell

Discharge capacities of the three-electrode beaker cells A1, B1, C1, and D1 were measured. The measurement of discharge capacity was conducted as follows. Each battery was charged to 4.3 V using a two-step charging, with 9.3 mA and 3.1 mA, and thereafter, with setting the end-of-discharge voltage at 3.1 V, the battery was discharged with 9.3 mA to 3.1 V, wherein the capacity of the battery was measured. The obtained capacity at that time was taken as the discharge capacity. The results of the measurement are shown in Table 1.

TABLE 1

| Battery | Element added | Discharge capacity (mAh/g) |
|---|---|---|
| A1 | Ex. 1 | Mg 0.5 mole + Zr 0.5 mole | 154 |
| C1 | Comp. Ex. 2 | Mg 0.5 mole | 154 |
| D1 | Comp. Ex. 3 | Zr 0.5 mole | 146 |
| B1 | Comp. Ex. 1 | No additive | 154 |

Measurement of Battery's Rated Capacity

Rated capacities of the batteries A2, B2 and D2 were measured. To obtain the rated capacity of a battery, the battery was charged with a 1400 mA constant current-constant voltage (cut-off at 70 mA) to 4.2 V, and then, with setting the end-of-discharge voltage at 3.0 V, discharged at 470 mA to 3.0 V, wherein the battery capacity was obtained and taken as the rated capacity.

Measurement of Battery's I-V Resistance

Measurements were performed to obtain I-V resistances of the batteries A2, B2, and D2. Each battery was charged at 1400 mA to 50% SOC. Thereafter, around 50% SOC, charging and discharging of each battery were carried out for 10 seconds at 280 mA, 700 mA, 2100 mA, and 4200 mA. The battery voltages after 10 seconds in the respective cases were plotted against the respective current values, and the gradient was taken as the I-V resistance.

Storage Performance Test

The batteries A2, B2, and D2 were charged at 1400 mA to 50% SOC, and thereafter subjected to a 30-day storage test at a constant temperature in which the temperature was kept at 65° C. After the storage, their rated capacities were measured in the same manner as described above to obtain their capacity recovery ratios. The capacity recovery ratios were calculated by dividing the battery rated capacities after the storage test by the battery rated capacities before the storage test. Further, after measuring the rated capacities, an I-V resistance measurement was conducted in the same manner as described above. From the results, increases in I-V resistance before and after the storage test were calculated. The capacity recovery ratios and the increases in I-V resistance before and after the storage for the batteries A2, B2, and D2 are shown in Table 2.

TABLE 2

| Battery | | Element added | Percentage increase in I-V resistance after storage test (%) |
|---|---|---|---|
| A2 | Ex. 1 | Mg 0.5 mole + Zr 0.5 mole | 1.9 |
| D2 | Comp. Ex. 3 | Zr 0.5 mole | 6.1 |
| B2 | Comp. Ex. 1 | No additive | 7.5 |

The results shown in Table 1 clearly demonstrate that the battery A1 of Example 1, in which both a group IVA element Zr and a group IIA element Mg were contained according to the present invention, exhibited the same discharge capacity as the battery B1 of Comparative Example 1, which contains no additives, and the battery C1 of Comparative Example 2, in which Mg alone was added. On the other hand, the battery D1 of Comparative Example 3, in which Zr alone was added, showed a lower discharge capacity.

In addition, the results shown in Table 2 clearly demonstrate that the battery A2 of Example 1, in which both Zr and Mg were added according to the present invention, exhibited a lower percentage of increase in I-V resistance after the storage test than the battery B2 of Comparative Example 1, which used no additives, and the battery D2 of Comparative Example 3, in which Zr alone was added. These results prove that adding, according to the present invention, both a group IVA element and a group IIA element to the lithium-transition metal composite oxide makes it possible to enhance the elevated-temperature durability (elevated-temperature storage performance) without degrading battery capacity.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese Patent Application No. 2004-158780, which is incorporated herein by reference in its entirety.

What is claimed is:

1. A non-aqueous electrolyte secondary battery, comprising: a positive electrode containing, as a positive electrode active material, a layered lithium transition metal composite oxide containing lithium, nickel, and manganese; a negative electrode containing a negative electrode active material capable of intercalating and deintercalating lithium; and a non-aqueous electrolyte having lithium ion conductivity, wherein said layered lithium transition metal composite oxide further contains at least one first element selected from the group consisting of Zr, Ti and Hf and at least one second element selected from the group consisting of Mg, Ca and Sr.

2. The non-aqueous electrolyte secondary battery according to claim 1, wherein said layered lithium transition metal composite oxide contains Zr and Mg.

3. The non-aqueous electrolyte secondary battery according to claim 2, wherein said first element and said second element are contained in substantially equimolar amounts 4. The non-aqueous electrolyte secondary battery according to claim 3, wherein said layered lithium transition metal composite oxide further contains cobalt.

5. The non-aqueous electrolyte secondary battery according to claim 2, wherein said layered lithium transition metal composite oxide further contains cobalt.

6. The non-aqueous electrolyte secondary battery according to claim 2, wherein said positive electrode active material comprises a mixture of said layered lithium transition metal composite oxide and a lithium-manganese composite oxide having a spinel structure.

7. The non-aqueous electrolyte secondary battery according to claim 1, wherein said first element and said second element are contained in substantially equimolar amounts.

8. The non-aqueous electrolyte secondary battery according to claim 7, wherein said layered lithium transition metal composite oxide further contains cobalt.

9. The non-aqueous electrolyte secondary battery according to claim 7, wherein said positive electrode active material comprises a mixture of said layered lithium transition metal composite oxide and a lithium-manganese composite oxide having a spinel structure.

10. The non-aqueous electrolyte secondary battery according to claim 1, wherein said layered lithium transition metal composite oxide further contains cobalt.

11. The non-aqueous electrolyte secondary battery according to claim 10, wherein said positive electrode active material comprises a mixture of said layered lithium transition metal composite oxide and a lithium-manganese composite oxide having a spinel structure.

12. The non-aqueous electrolyte secondary battery according to claim 1, wherein said positive electrode active material comprises a mixture of said layered lithium transition metal composite oxide and a lithium-manganese composite oxide having a spinel structure.

* * * * *